July 6, 1954
J. C. BENDER
2,683,042
COLLET FIXTURE
Filed July 11, 1952
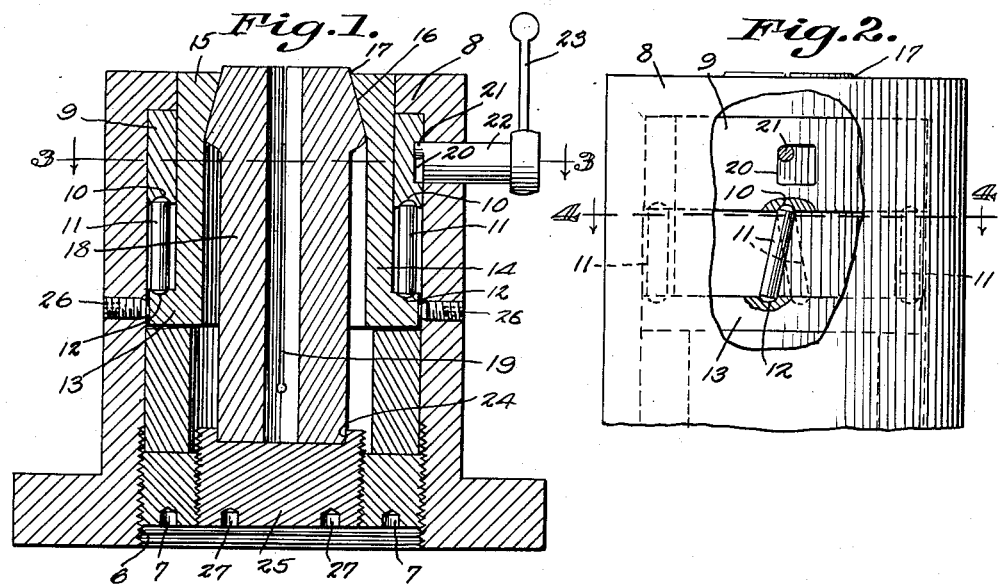
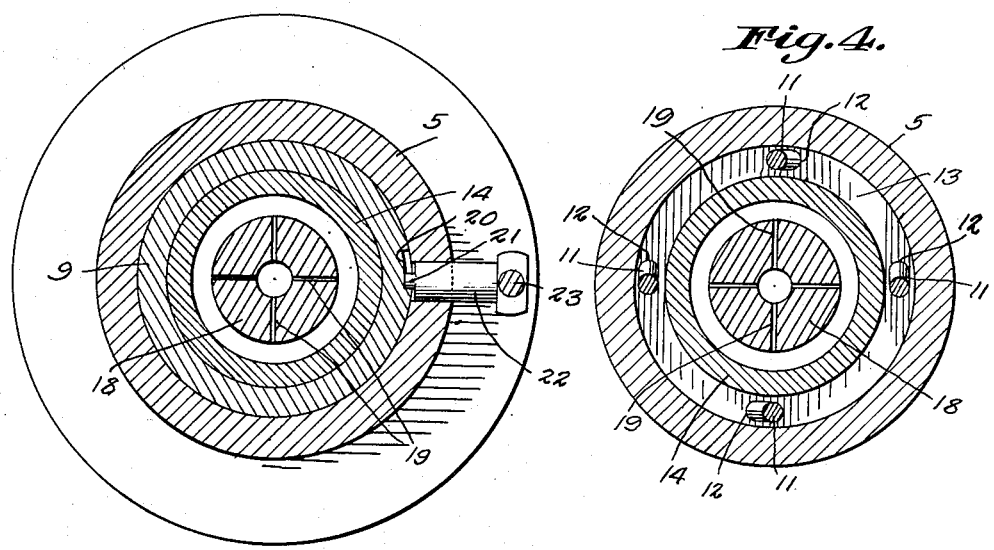
John C. Bender
INVENTOR
BY Knowles
ATTORNEYS.

Patented July 6, 1954

2,683,042

UNITED STATES PATENT OFFICE 2,683,042

COLLET FIXTURE

John C. Bender, Hartville, Ohio

Application July 11, 1952, Serial No. 298,408

2 Claims. (Cl. 279—50)

This invention relates to collet fixture construction.

The primary object of the invention is to provide a collet fixture which is so constructed and arranged that the operation of the collet held therein, will be positive insuring a firm gripping of the tool held therein.

Another object of the invention is to provide a collet fixture wherein the collet may be adjusted to vary the initial position of the collet within its fixture, adapting it for use in holding tools of various sizes.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a vertical sectional view through a collet fixture in a collet held therein.

Fig. 2 is an elevational view of a collet fixture, a portion thereof being broken away illustrating the operating means of the fixture for operating the collet.

Fig. 3 is a sectional view taken on line 3—3 of Fig. 1.

Fig. 4 is a sectional view taken on line 4—4 of Fig. 2.

Referring to the drawing in detail, the fixture includes a cylindrical housing or body portion 5 which is internally threaded to receive the spacer ring nut 6 formed with recesses 7 for the reception of a tool used in positioning the nut 6.

As shown, the outer end of the housing or body portion 5 is formed with an inwardly extended annular rib 8 against which the collar 9 engages, the collar 9 having recesses 10 formed in the inner edge thereof, in which one of the respective ends of the pins 11 are held, the opposite ends of the pins being fitted in the recesses 12 formed in the laterally extended annular rib 13 formed at the inner end of the collet thrust member 14.

The collet thrust member 14 is formed with an enlarged end 15 formed with an inclined inner surface 16 which cooperates with the beveled edge 17 of the collet 18. The collet is formed with longitudinally disposed slots 19 which provide jaws in gripping a tool held in the collet.

As shown, the collar 9 is formed with a rectangular recess 20 formed in the outer surface thereof, in which the lug 21 of the key 22 extends, the lug 21 being eccentrically formed in the inner end of the key, as clearly shown by the drawing.

The handle 23 is secured to the outer end of the key 22 and affords means whereby the key 22 may be rotated, with the result that the lug 21 engaging one wall of the recess 20 will rotate the collar, and since the pins 11 are in an inclined position, it is obvious that as the collar 9 is rotated, the pins will move to vertical positions and the inclined inner surface of the collet thrust member 14 will move over the beveled edge 17 of the collet, forcing the collet into close engagement with the work held therein. As shown, the collet rests in the recess 24 formed in the threaded plug 25 that fits within the spacer ring nut 6, cooperating with the internal threads thereof in adjusting the initial position of the collet.

Extending into the threaded openings of the housing or body portion 5, are set screws 26 that have their inner ends disposed in grooves formed in the collet thrust member to prevent the turning of the collet thrust member when the collar 9 is rotated.

The threaded plug 25 is also provided with sockets 27 for the reception of a wrench to properly adjust the plug 25.

From the foregoing it will be seen that due to the construction shown and described, I have provided a collet which is so constructed and arranged that it will be securely held in position to grip an article under operation to hold the same against movement, which is absolutely necessary in precision work.

Having thus described the invention, what is claimed is:

1. A collet fixture comprising a cylindrical housing, an annular inwardly extended rib formed on one end of said cylindrical housing, a longitudinally split collet providing jaws, the outer surface of one end of said collet being tapered and disposed within said housing, a collet thrust member having an inclined inner surface at one end thereof cooperating with the tapered outer surface of said collet in moving said jaws in gripping a tool, an outwardly extended annular flange formed on the lower end of said thrust member, a collar rotatably mounted on the collet thrust member between said outwardly extended flange thereof and inwardly extended annular rib, said collar being disposed in spaced relation with said outwardly extended annular flange of said thrust member, spaced normally inclined pins resting on the outwardly extended annular flange of said thrust member and engaging said collar, supporting said collar, and means for effecting rotation of said collar, moving said pins and said thrust member longitudinally of the collet operating the jaws to grip or release a tool held in the collet.

2. A collet fixture comprising a cylindrical housing, an inwardly extended rib formed on one end of said cylindrical housing, a longitudinally split collet providing jaws mounted within the housing, the outer surface of one end of said collet being tapered, a collet thrust member mounted within the housing and having an inclined inner surface resting against the tapered surface of the collet moving the jaws of the collet towards each other as said thrust member moves downwardly, an outwardly extended annular flange on one end of said thrust member disposed below the inwardly extended rib of said housing, a collar rotatably mounted between said rib and annular flange, pins engaging the collar and flange, said pins being normally inclined, holding the collar spaced from said flange, said collar having a rectangular opening formed in one surface thereof, a key extending transversely through the wall of the housing, a pin eccentrically formed on one end of said key movable within said rectangular opening in contact with the edge of said opening effecting rotation of said collar as said key is rotated, tilting said pins moving said collar and thrust member with respect to each other, and a handle on one end of said key.

References Cited in the file of this patent

UNITED STATES PATENTS

| Number | Name | Date |
|---|---|---|
| 627,815 | Austin | June 27, 1899 |
| 725,346 | Krug | Apr. 14, 1903 |
| 2,196,589 | Jimmerson | Apr. 9, 1940 |
| 2,420,067 | Crozier | May 6, 1947 |

FOREIGN PATENTS

| Number | Country | Date |
|---|---|---|
| 585,197 | Great Britain | Jan. 31, 1947 |